(12) United States Patent
Hommel et al.

(10) Patent No.: US 6,573,861 B1
(45) Date of Patent: Jun. 3, 2003

(54) TARGET CLASSIFICATION METHOD

(75) Inventors: Hans Hommel, Weingarten (DE); Franz Jehle, Ulm (DE); Martin König, Günzburg (DE); Johnannes Schmid, Ulm (DE); Dietmar Talke, Ulm (DE); Erwin Wölfle, Ehingen (DE)

(73) Assignee: Telefunken Systemtechnik GmbH, Ulm (DE)

( * ) Notice: Subject to any disclaimer, the term of this patent is extended or adjusted under 35 U.S.C. 154(b) by 0 days.

(21) Appl. No.: 07/259,987

(22) Filed: Oct. 20, 1988

(30) Foreign Application Priority Data

Oct. 28, 1987 (DE) ............................................. 37 36 420
Aug. 6, 1988 (DE) ............................................. 38 26 754

(51) Int. Cl.⁷ .............................................. G01S 13/00
(52) U.S. Cl. ........................................ 342/192; 342/193
(58) Field of Search ................................... 342/192, 193

(56) References Cited

U.S. PATENT DOCUMENTS

| | | | | |
|---|---|---|---|---|
| 4,275,396 A | | 6/1981 | Jacomini | |
| 4,348,674 A | * | 9/1982 | Muth et al. | 342/192 |
| 4,389,647 A | * | 6/1983 | Fanuele et al. | 342/192 |
| 4,422,333 A | | 12/1983 | Leon | |
| 4,603,331 A | * | 7/1986 | Wehner | 342/192 |
| 4,641,138 A | * | 2/1987 | Opitz | 342/192 |
| 4,719,606 A | * | 1/1988 | Andrieu | 342/192 |

FOREIGN PATENT DOCUMENTS

| | | |
|---|---|---|
| EP | 0102640 | 3/1984 |
| EP | 0239022 | 9/1987 |
| GB | 1268620 | 3/1972 |
| GB | 2054310 | 7/1979 |
| GB | 2189962 | 10/1981 |

* cited by examiner

*Primary Examiner*—Mark Hellner
(74) *Attorney, Agent, or Firm*—Venable; Norman N. Kunitz (57) ABSTRACT

A target classification method for radar systems wherein, in particular, jet aircraft, are classified in that the blade repetition rate and, in a further step, the number of blades, of an engine rotor wheel are determined and thus the type of engine is identified. Helicopters are classified by determining the blade repetition period of the primary or tail rotor.

20 Claims, 7 Drawing Sheets

TARGET CLASSIFICATION METHOD

BACKGROUND OF THE INVENTION

The present invention relates to a target classification method for a radar system.

German Patent Applications DE 2,928,907.A1 (published Jun. 19, 1981) and DE 3,001,148.A1 (published Oct. 5, 1981), which are both related to U.S. Pat. No. 4,348,674, disclose methods for the classification of moving targets in which, in a Doppler radar system, Doppler spectra are formed from the echo signals and these spectra, in addition to forming the basis of a determination of the target velocity from the Doppler frequency of the primary target line in the Doppler spectrum, are examined for secondary lines originating from periodic changes of the reflection behavior of the target or parts of the target. For example, the blade repetition rate of the engine rotor of an aircraft jet engine or the length of a tank's track-laying chain links can be determined from the spacing of the secondary lines, and this information can be utilized to classify the target. However, the blade repetition rate of an aircraft engine is only conditionally suitable as a classification feature since the rate of rotation of the rotor may vary over a broad range.

Target classification methods are of great significance for noncooperative identification Friend or Foe (IFF), for example for systems operating with exclusive utilization of the information furnished by the on-board radar system of an aircraft.

SUMMARY OF THE INVENTION

It is an object of the present invention to provide such noncooperative target classification methods.

The above object is achieved according to a first embodiment of the invention by a target classification method including comparing target information extracted from the echo signals of a Doppler radar signal with stored patterns, with a jet aircraft being classified by identification of its engine type, and including transforming the radar echo signals to a Doppler Spectrum signal by coherent processing, determining a value for the blade repetition rate of an engine rotor of the target from the Doppler spectrum, and using the blade repetition rate for identification; wherein the method further comprises: additionally analyzing those components of the echo signal modulation in the Doppler spectrum which are periodic with the rotation of the rotor and determining therefrom a value for the rate of rotation of the rotor; determining the number of blades of the engine rotor from the blade repetition rate and the rate of rotation; and utilizing the determined number of the blades of one engine rotor as a classification parameter during the step of comparing.

The above object is achieved according to a further embodiment of the invention by a target classification method utilizing the echo signal of a Doppler radar including comparing target information extracted from the echo signal of a Doppler radar with stored patterns, which method further comprises transforming the radar echo signals to a Doppler spectrum signal by coherent processing; and classifying a helicopter by: freeing the Doppler spectrum signal of the primary target echo (Fuselage echo); retransforming the remaining Doppler spectrum signal to a time domain signal; determining the blade repetition duration of the primary or tail rotor of the helicopter from the retransformed time domain signal; and utilizing the determined blade repetition determination for classification during the step of comparing.

The above object is achieved according to a still further embodiment of the invention by a target classification method utilizing the echo signal of a radar system, and including comparing target information extracted from the echo signal of the radar system with stored patterns, and further including: using a plurality of measured values of the radar echo signal to detect the type of modulation; obtaining at least one or a plurality of measured variables from each measured value; determining the statistical distribution of the measured variables in all measured values; and comparing the statistical distribution patterns with stored patterns.

While the blade repetition rate of the engine rotors of jet aircraft, which may vary over a broad range as a function of the momentary load on the engine, is evaluated in the prior art, the present invention is based on the idea of also determining the rate of rotation of the engine rotors. Although this rate also varies over a broad range, the quotient of the blade repetition rate and the rate of rotation is constant for one and the same engine type and equals the number of blades of the rotor. Determination of the target parameters of blade repetition rate and rate of rotation and their combined evaluation and formation of a quotient from the two parameters and comparing it with stored patterns thus makes it possible to unequivocally identify the engine type independently of the varying momentary operating state of the engine.

The invention utilizes the realization that the reflection behavior of an engine in successive, comparable rotor blade positions coincides substantially, though not completely, so that the echo signal receives a modulation which is periodic with a complete revolution of the engine rotor.

By suppressing the primary target echo in the Doppler spectrum as well as possibly existing clutter components, the signal components which are periodic with the revolution time of the engine rotor wheel become more distinct. Preferably, the blade repetition rate is determined from the Doppler spectrum in a known manner and spectral lines originating from the blade repetition modulation are eliminated so that the remaining spectrum is determined to a significant degree by the modulation caused by the rotation of the rotor wheel.

DETAILED DESCRIPTION OF THE PREFERRED EMBODIMENTS

To better clarify the principle of the invention, the description below is based on a low-noise echo signal.

Figure 1:
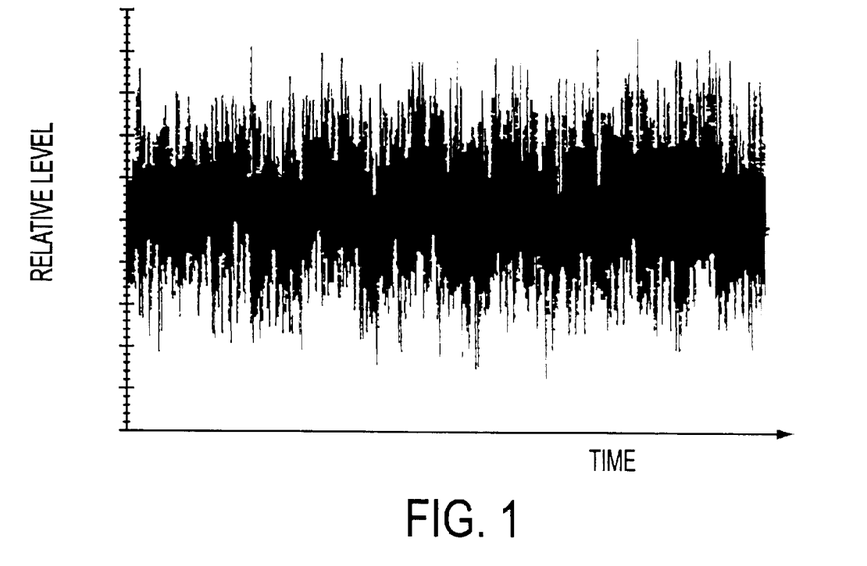
FIG. 1 shows the time curve of an echo signal.

Although the echo signal according to FIG. 1 is obviously level modulated, its periodic components cannot be obtained directly from the echo signal. This echo signal is transformed in a known manner into a Doppler spectrum, for example by means of a Fourier transformation and possibly prior multiplication with an amplitude weighting function (e.g. Hamming or Blackman time window). The Doppler spectrum includes, inter alia, a strong primary target line at the Doppler frequency corresponding to the radial velocity of the target and, in addition to clutter and noise components, noticeable secondary lines which originate from the blade repetition modulation of the echo signal. After suppression of the primary target line (as well as possibly existing clutter components) and shifting the spectrum to target Doppler frequency zero there results, for example, the power spectrum sketched in FIG. 2.

A preferred embodiment of the invention provides that the spectrum, which has been freed of components of the primary target echo and possibly existing clutter components, is transformed back into the time domain by means of an inverse Fourier transformation and the thus obtained time domain signal is subjected to further processing in order to emphasize existing signal periods. For this purpose, an average is formed in the retransformed time domain signal over the levels of the line multiples. Together with the preceding Fourier transformations, this procedure corresponds to a maximum likelihood estimation process for the rate of rotation as described, for example, in an article by James D. Wise et al, entitled "Maximum Likelihood Pitch Determination," in *IEEE Transactions on Acoustics, Speech and Signal Processing*, Vol. ASSP-24, No. 5, October, 1976, pages 418–423.

Figure 2:
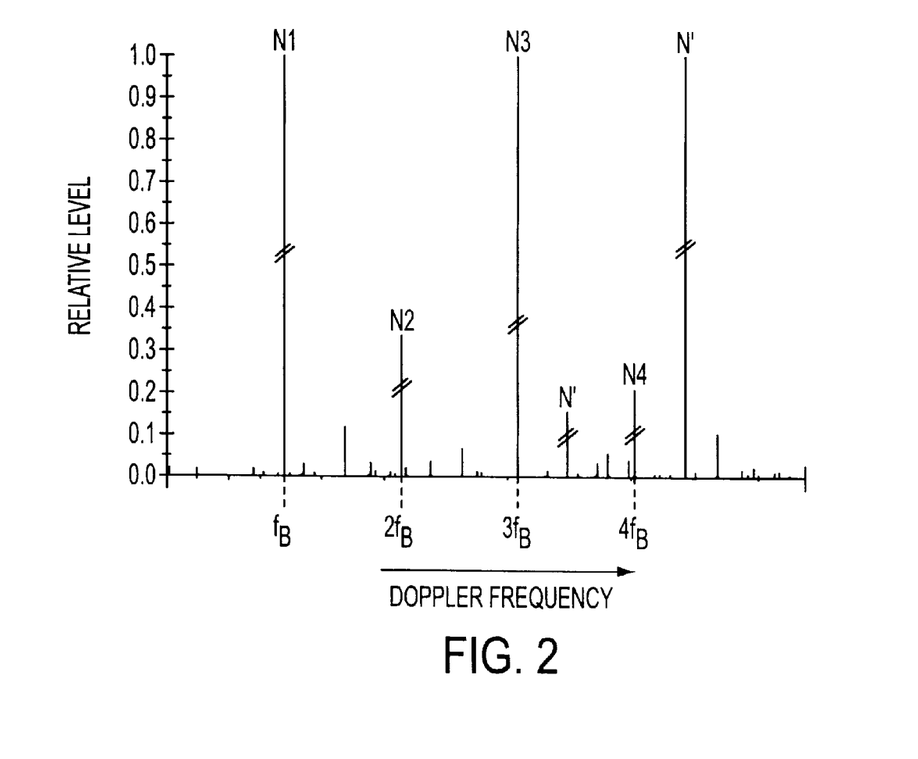
FIG. 2 shows an associated power spectrum.

The power spectrum shown in FIG. 2 is obtained by Fourier transformation from a low-noise echo signal from a jet aircraft. The primary target echo as well as clutter components in the spectrum have already been suppressed and the entire spectrum is shifted in a known manner to target Doppler frequency zero. Clearly noticeable are the periodic secondary lines N1, N2, N3, N4 originating from blade repetition modulation at whole number multiples of the fundamental frequency fB of the blade repetition. Further secondary lines originating from blade repetition modulation and occurring at other Doppler frequencies due to convolution effects but again having the same line spacing $f_B$ from one another and from the border of the spectrum are marked N'. From this spectrum, the fundamental frequency is determined in a known manner as the blade repetition rate $f_B$. Thereafter, the lines originating from the blade repetition rate are eliminated (indicated by transverse dashes in the lines). For spectra present in digital form, the stored values in the range of these lines are simply set to zero. The remaining spectrum is transformed back to the time domain and is subjected to the mentioned maximum likelihood estimation for a determination of the rate of rotation and rotation period, respectively.

Figure 3:
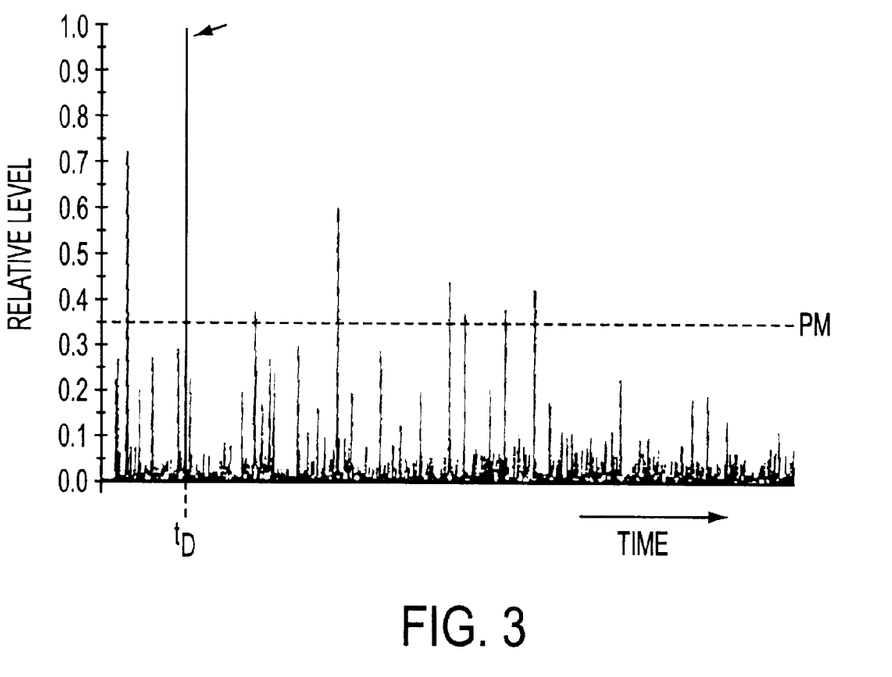
FIG. 3 shows the time function derived from this spectrum by retransformation and maximum likelihood estimation.

FIG. 3 shows the result of such processing as a function of time with a clearly noticeable projecting line (indicated by an arrow). The associated value on the time axis represents the rotation period $t_D$, i.e. the time of one revolution of the engine rotor. To confirm the thus determined value for rotation period $t_D$, the remaining lines of the time function can also be evaluated, with a level threshold PM preferably being set and only the lines exceeding the threshold being evaluated further. The level threshold is advantageously set with reference to the level maximum and, in the illustrated example, is 35% of the level maximum. In principle, all lines exceeding the threshold are examined as to whether, in connection with the blade repetition rate already known from the spectrum, they furnish an appropriate blade number, and only lines meeting this criterion are considered further.

The number of blades of the engine rotor can be determined with great accuracy from the time of one revolution tD, or the rate of rotation $fD=1/t_D$, and the blade repetition rate, so that a target parameter is available which has a high classification value.

Generally, according to the invention, the number of blades can be determined with the above-described method with such accuracy that resulting intermediate values which are not whole numbers can be discarded as unclassifiable or can be evaluated as an indication of intentional interference, i.e. electronic countermeasures (ECM). This can be indicated to an observer and/or may automatically actuate counter-countermeasures (ECCM) for suppression or circumvention of the interference.

Figure 4:
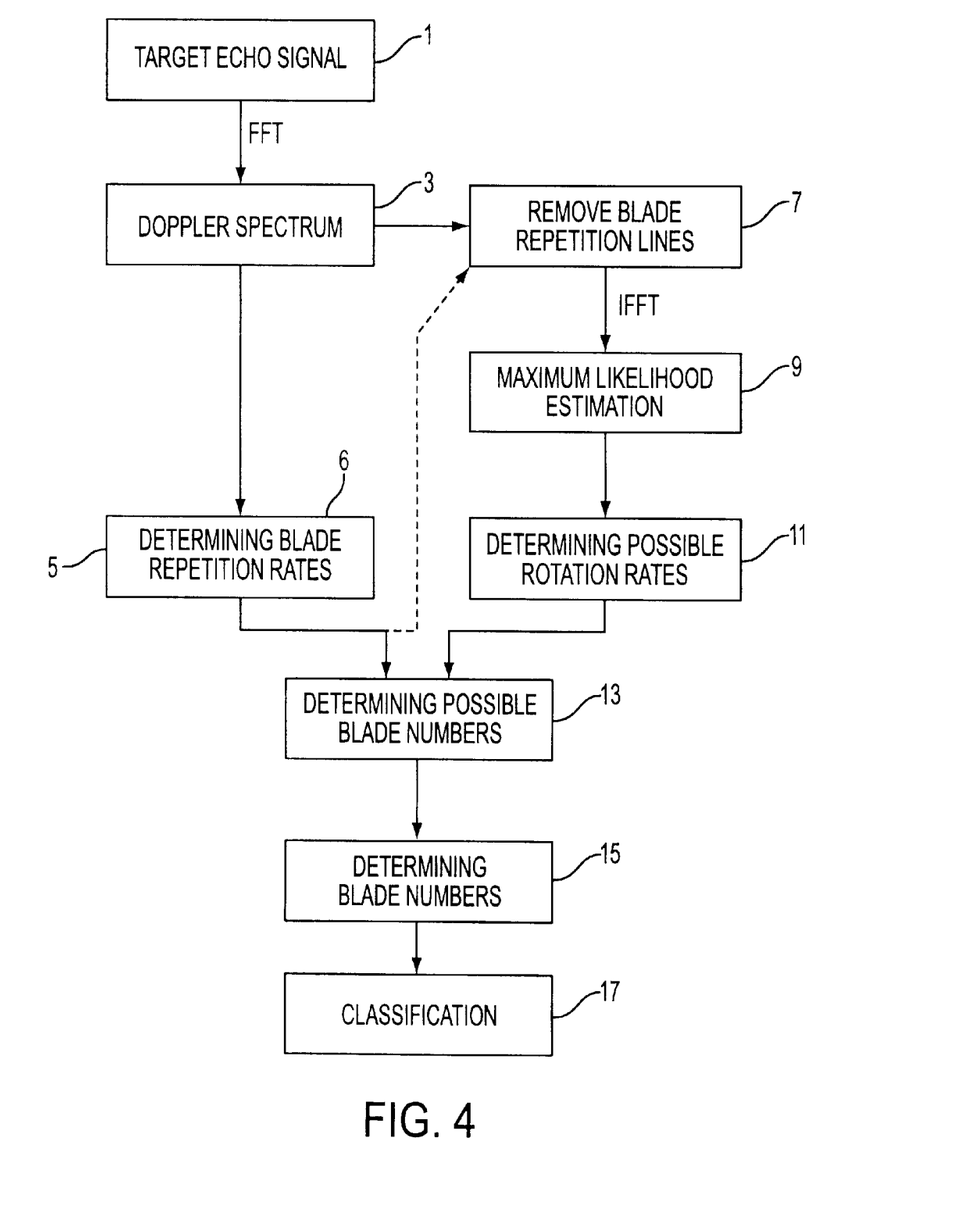
FIG. 4 shows the basic process sequence according to the invention.

FIG. 4 shows a block diagram of the method steps according to the invention described above. From a radar echo signal (1), initially a Doppler spectrum (3) is obtained by means of a fast Fourier transform (FFT). The Doppler spectrum is then processed at (5) as described above to determine the primary target line and the periodic secondary lines and to determine from these lines one or several values for the blade repetition rate. Several values may result, for example, in multiple target situations or in connection with engines having a plurality of rotor wheels.

In a further processing step (7), the Doppler spectrum is shifted to a Doppler frequency equal to zero for the primary target line and is freed of the primary target line and of clutter. In addition, by referring back to the determined blade repetition rate (indicated by the dashed line 6), the blade repetition lines are removed from the spectrum and the remaining spectrum is transformed back to the time domain by means of an inverse Fourier transform (IFFT). Thereafter, an average is formed over the levels of the line multiples (maximum likelihood estimation) in the time domain of the remaining spectrum (9), and from the resulting maximum likelihood time function (see FIG. 3), possible rotation rate values are extracted for the rates of rotation or, their reciprocal values, the rotation periods $t_D$ (11). Thereafter, by calculation, these possible rotation rate values (11) are linked in pairs with the blade repetition rates determined from the spectrum (5) so as to form possible blade number values (13). From these possible blade number values, the actual blade number values are then determined (15). For this purpose, for example, the possible blade number values lying outside of an appropriate blade number range are excluded right from the start. Moreover, values that are not whole numbers can likewise be excluded immediately but may also be evaluated as a sign of intentional interference. From the remaining possible blade number values, the coinciding blade numbers resulting from a comparison with stored blade numbers (library) are determined as classification parameters and the blade number of the target, or several blade numbers in multiple target situations or the like, are put out and used to classify the target (17).

The target parameters, i.e., blade repetition rate and blade number, are determined repeatedly, successively in time, and during the classification step (17), are subjected preferably to an M-of-N detection process. That is, a target is classified or identified if agreement is detected at least M times during N comparisons, where M<N.

According to another embodiment, the Doppler spectrum (3) is logarithmed before retransformation. Such a logarithmed spectrum is shown in FIG. 5 where again the spectrum has been standardized so that the Doppler frequency of the primary line equals zero and the primary target echo and clutter components of the spectrum have already been suppressed.

Figure 5:
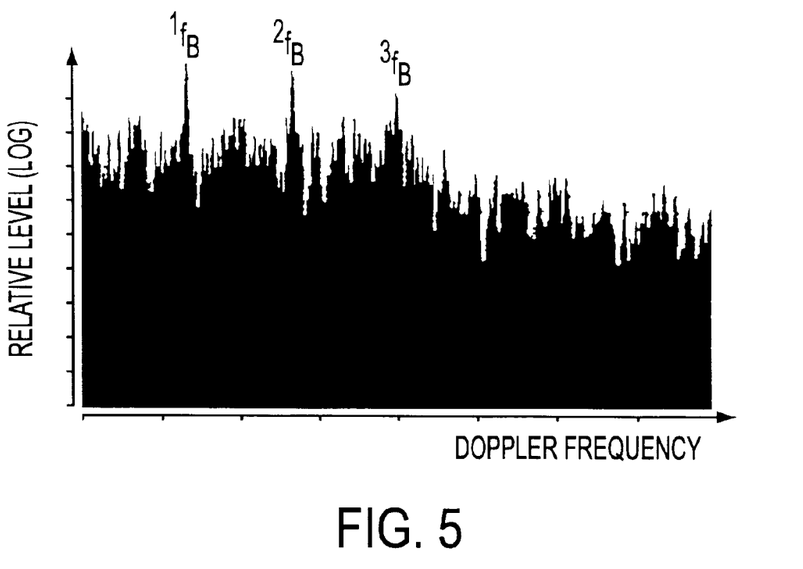
FIG. 5 shows a logarithmed spectrum.

Still clearly noticeable are the secondary lines originating from the blade repetition frequency at Doppler frequencies $f_B$, $2f_B$, $3f_B$. No spectral lines that can be unequivocally associated with the rotation of the turbine rotor can be found in the spectrum. The logarithmed spectrum is retransformed into the time domain, for example by means of inverse Fourier transformation, resulting in the time domain signal whose basic structure is sketched in FIG. 6. This time domain signal is essentially composed of a few narrow lines whose position within the time domain signal is characteristic for periodic modulation of the radar echo signal. Since the periodic modulations of the radar echo signal are again the result of rotating and/or oscillating parts of the target and the identifying variables for rotation and oscillation are different in the targets to be distinguished, the targets can be classified with the aid of the retransformed time domain signal by way of a comparison with stored patterns (library).

A method employing similar steps is known in the voice analysis art as the Cepstrum method and is described, for example, by A. Michael Noll in an article, entitled, "Cepstrum Pitch Determination," in *The Journal of the Acoustical Society of America*, Vol. 41, (1967), pages 293–309.

Figure 6:
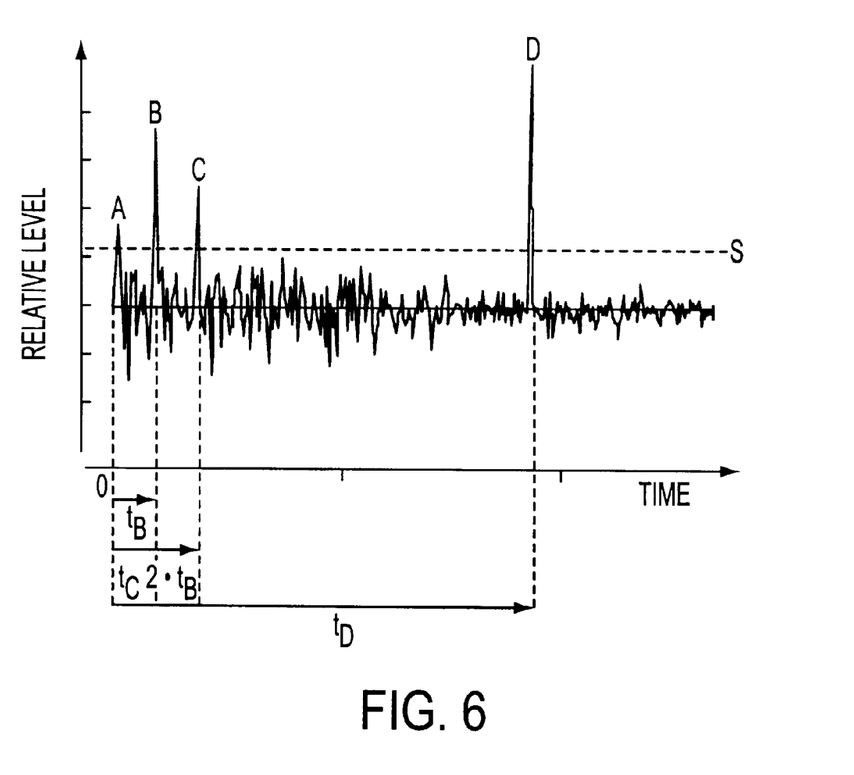
FIG. 6 shows the time domain signal obtained by retransformation of the spectrum of FIG. 5.

The plurality of projecting lines in the time domain signal of FIG. 6 can be separated in an easy and advantageous manner by means of a level threshold S and only the signal components of the time domain signal which exceed this threshold are utilized for further evaluation. In the example shown in FIG. 6, these are assumed to be lines A, B, C and D. Line A at the beginning of the time axis represents a type of direct voltage component of the echo and contains no information about modulation from moving parts of the target. This line is thus not considered in the evaluation. The first line B originating from the rotating rotor of the engine indicates, by its position $t_B$ on the time axis, the time difference between equivalent positions of successive rotor vanes or blades. Line C, compared to line B, lies at a time value $t_C$ which is double the time value $t_B$ and constitutes a sort of harmonic to line B. Line C contains no significant additional information compared to line B but may be evaluated to improve the measured value $t_B$. The blade repetition rate value $f_B$, which is the reciprocal of blade repetition period $t_B$, could also be determined, as known in the art, from the spacing of the secondary lines of the spectrum (FIG. 2). Finally, line D of the retransformed time domain signal results from the rotation of the engine rotor and its position $t_D$ on the time axis provides the time required for one revolution of the engine rotor. The target classification with the aid of the time domain signal of FIG. 6 can be performed, for example, in that time windows are given for signal components B and D on the basis of a prior knowledge of the operating parameters and structural features of engines which could appear as targets and these are compared with the values measured for $t_B$ and $t_D$. Since, however, rate of rotation and blade repetition rate sometimes vary considerably in different flight situations in order to produce optimum engine efficiency, such fluctuations must be considered in the establishment of the time window patterns.

However, a variable which remains constant and has a high classification value is the number of vanes (blades) of the engine rotor. This variable is obtained from the measured values $t_B$ and $t_D$ of the time domain signal of FIG. 6 by quotient formation $t_D/t_B$ and is a direct indication of the number of blades of the engine rotor.

If, as already mentioned, instead of the measured value $t_B$ from the retransformed time domain signal, the equivalent variable of the blade repetition rate $f_B$ is determined from the spectrum, the spectral components resulting from the blade repetition modulation can be eliminated from the spectrum before the inverse Fourier transformation is performed, thus making the time domain signal easier to evaluate.

Another embodiment provides for a determination of the number of blades in the spectral domain in that the blade repetition rate is determined from the spectrum in a known manner and model of hypothetical spectra are produced for the same blade repetition rate for various hypothetical blade numbers of engine rotors and these are each cross-correlated with the Doppler spectrum (3) formed from the radar echo signal (1). The measured spectrum and the produced hypothetical spectra must then be brought into congruence with respect to the Doppler frequency of the primary target line, which is done in a known manner by shifting the measured spectrum by the Doppler frequency of the primary line and thus standardizing it to the primary line Doppler frequency of zero. The correlation produces a correlation value K for each hypothetical spectrum or for each hypothetical blade number, respectively.

Figure 8:
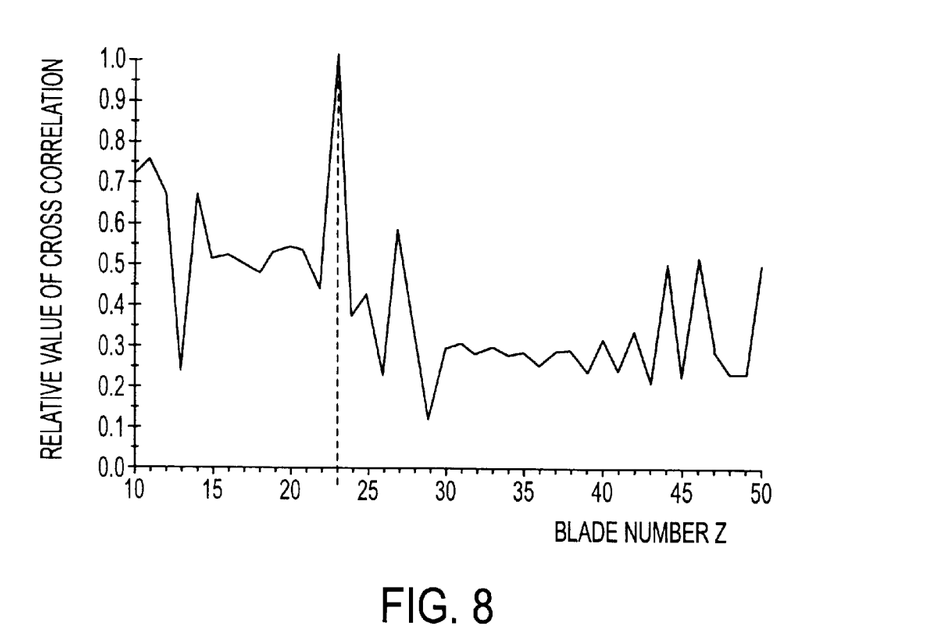
FIG. 8 shows the result of the correlation of FIG. 7.

The resulting correlation values are plotted in FIG. 8 for an exemplary case as a function of the different blade numbers which serve as the basis. The maximum correlation value is determined and the associated blade number is utilized as a classification parameter. Advantageously, in this embodiment not only blade numbers considered associatable for classification but also blade numbers which do not occur in known engines are considered so as to detect any possibly occurring electronic deception measures by the enemy and to be able to react to them correctly. Preferably, the primary target line, possibly existing clutter and the secondary lines resulting from blade repetition modulation are again removed from the target Doppler spectrum before the cross-correlation is performed. In the hypothetical spectra, only echo signal modulations as a result of rotation of the rotor are considered right from the start.

Figure 7A:
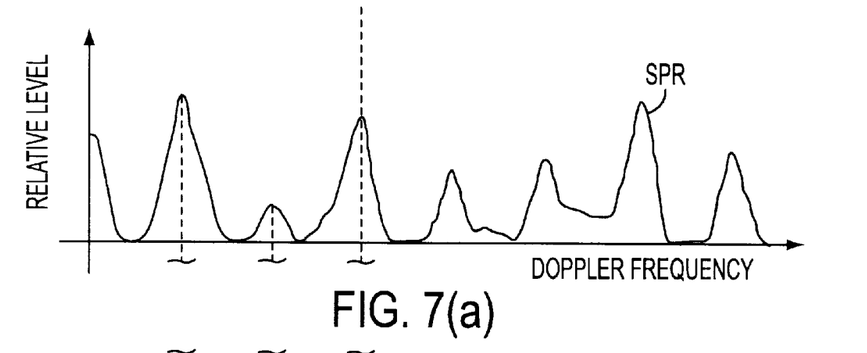
FIGS. 7a and 7b show the principle of blade number determination by the correlation of spectra according to a modification of the method of the invention.

FIG. 7a shows a section of a measured Doppler spectrum SPR, i.e. a spectrum obtained from an echo signal by Fourier transformation, with the spectrum already having been shifted to the primary line Doppler frequency zero and spectrum components from the primary line, clutter and secondary blade repetition lines having already been suppressed.

Figure 7B:
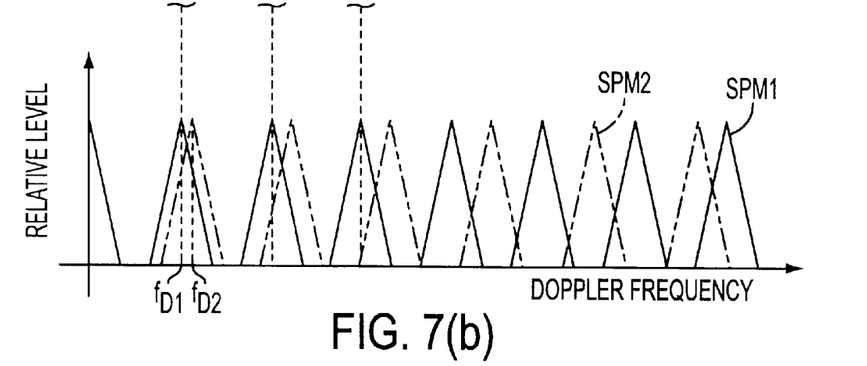

FIG. 7b shows two hypothetical spectra SPM 1 (solid line) and SPM 2 (broken line) for two different rotation rates $f_{D1}$ and $f_{D2}$ corresponding to two different blade numbers Z1 and Z2. The sample spectra for the hypothetical blade numbers $Z_i$ and the blade repetition rate $f_B$ determined in a known manner from the Doppler spectrum (e.g., FIG. 2) are assembled, for example, from frequency equidistant lines (triangles in FIG. 7b) at the frequency spacing of rotation rates $f_{Di}=f_B/Z_i$. Correlation values result from cross correlation (multiplication and summing) of a sample spectrum with the measured spectrum. Different correlation values result for different hypothetical blade numbers, with the sample spectrum having the best coincidence of lines (SPM 1 in FIG. 7) furnishing the highest correlation value.

The correlation results for a continuing series of hypothetical blade numbers are plotted in FIG. 8, with a clear maximum being evident whose associated value on the abscissa is evaluated as the number of blades of the target engine rotor for classification.

Figure 10:
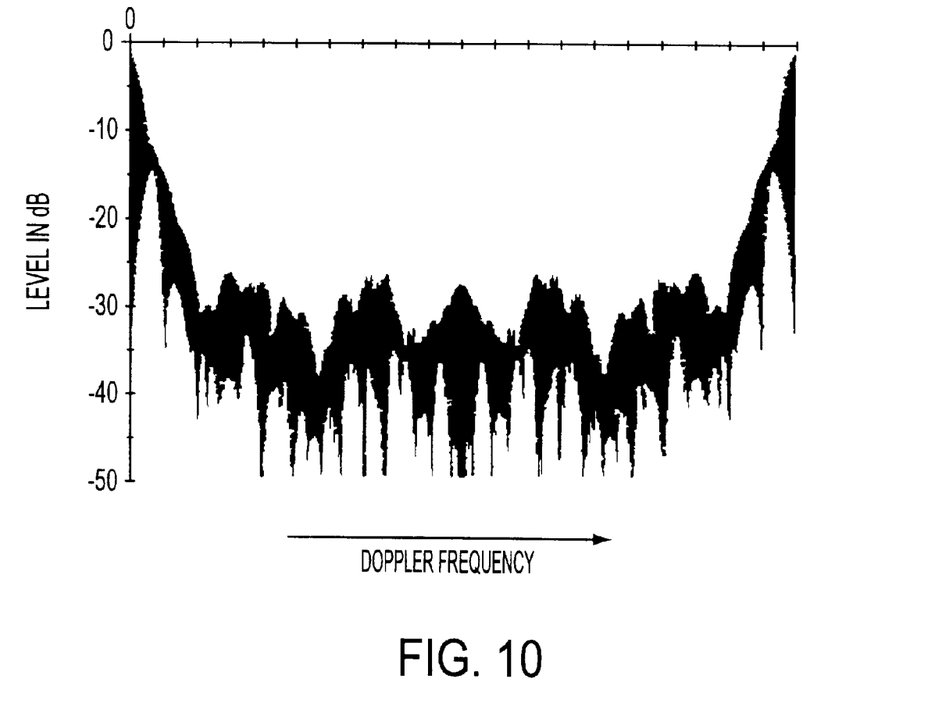
FIG. 10 shows the associated Doppler spectrum.
Figure 11:
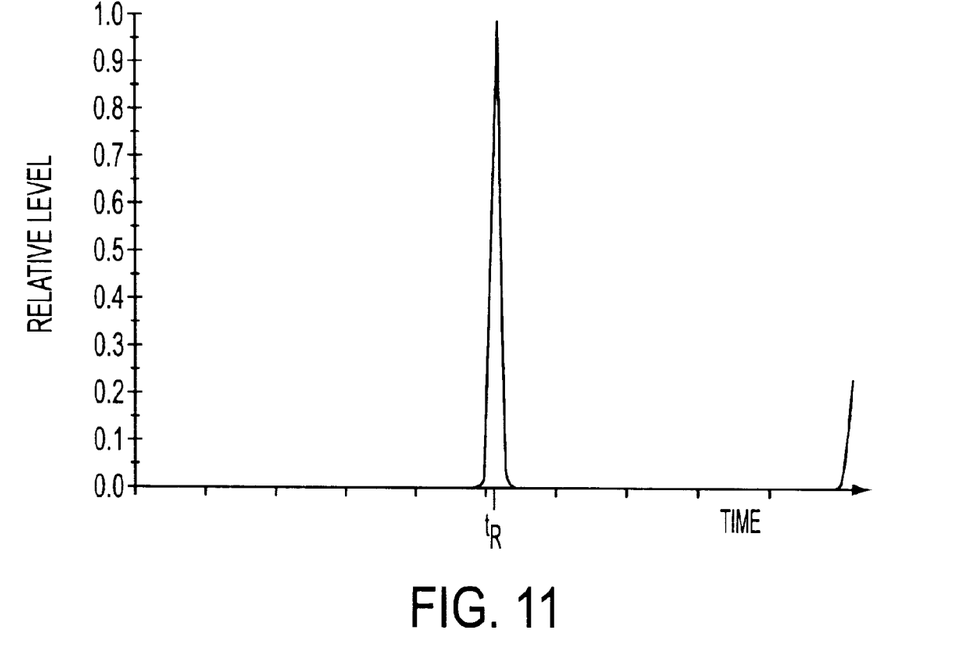
FIG. 11 shows the maximum likelihood function of the retransformed time domain signal.

While in aircraft engines the number of rotor blades is a variable which can be used to distinguish different aircraft, this is not the case for helicopters. However, helicopters can be well distinguished by the blade repetition rate or rate of rotation of their main or tail rotor. To classify helicopters by their rotor echo component, one feature of the present invention provides for the determination of the blade repetition rate and blade repetition period, respectively, of the main or tail rotor of a helicopter and utilizes it for classification. In a similar manner as for the already described determination of the rate of rotation or rotation period of an engine rotor, the Doppler spectrum is freed of the primary target echo (fuselage echo) and is transformed back into the time domain. The time domain signal is then used to determine a value for the blade repetition period of the rotor, which serves as a classification feature. Analogously to the procedure for processing engine radar echoes described in detail above, the time domain signal can advantageously be subjected to a maximum likelihood estimation procedure to emphasize existing signal periods and the blade repetition period can be determined from the line with the maximum level in the maximum likelihood function. As an alternative, the spectrum can be logarithmed before the retransformation. Preferably, before the spectrum is formed, the radar echo signal is subjected to preliminary processing in order to suppress the fine structure of the modulation so that the signal periods contained in this fine structure will not interfere with further processing. The determination of the blade repetition period for the classification of helicopters will be described in greater detail below with reference to an embodiment illustrated in FIGS. 9, 10 and 11.

Figure 9:
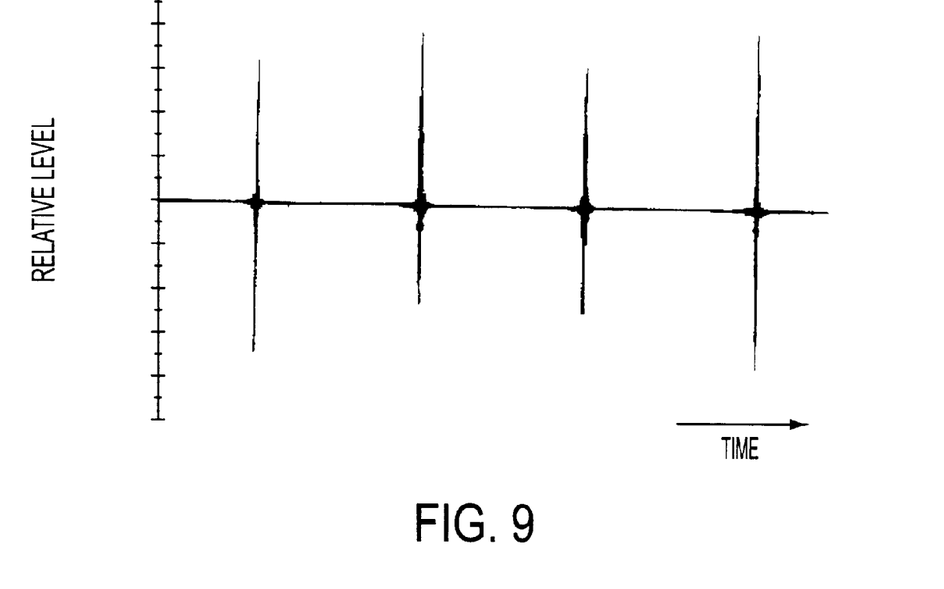
FIG. 9 shows a noise-free radar echo signal from the rotor of a helicopter.

The echo signal according to FIG. 9 clearly reveals regular peaks indicative of successive rotor positions equivalent to the blade repetition time of the rotor. The signal present in quadrature form (I and Q channel) also shows a finely structured modulation which, however, does not furnish any information about the blade repetition period. In a real case, the signal has superposed noise and clutter so that the blade repetition period cannot be determined with satisfactory reliability directly from the echo signal. To eliminate the fine modulation structure of the echo signal, the modulus of the echo signal is formed from its two quadrature components. By means of a Fourier transformation, a Doppler spectrum is formed from the modulus signal. The radial velocity of the target can then be determined from the primary target line of the Doppler spectrum. After shifting the Doppler spectrum to the zero position on the primary line and after suppressing the primary line and possibly existing clutter components, the remaining spectrum shown in FIG. 10 results. In contrast to the spectrum of the engine echo according to FIG. 2, the spectrum according to FIG. 10 does not show an easily evaluatable structure for a determination of the blade repetition rate. The spectrum is transformed back into the time domain by means of an inverse Fourier transformation and the thus obtained time domain signal is subjected to a maximum likelihood estimation process (averaging over line multiples), resulting in the time function sketched in FIG. 11. This function shows a clear line at blade repetition period $t_R$ on the time axis. By comparing the thus determined period $t_R$ with values stored in a library, the type of helicopter can be determined.

Because of the substantial coincidence of the manner of proceeding in the determination of the revolution time of an engine rotor and in the determination of the blade repetition period of a helicopter rotor, it is of advantage to employ substantially the same signal processing devices for both cases and to make a preliminary decision regarding the presence of an echo from a jet aircraft or a helicopter, for example with the aid of the target velocity, its flight behavior, the basic structure of its spectrum, etc.

According to a further favorable feature of the target classification system, the echo signals are statistically analyzed in such a manner that one or several measuring variables are obtained from a plurality of measured values, that the statistical distribution of the measured values is determined separately and compared with stored patterns. Advantageously characteristic variables for statistical distribution, such as maxima, fluctuation range, etc. are formed for pattern comparison and are compared with stored patterns of characteristic variables. Preferably, amplitudes and phase positions or phase differences between successive measured values are obtained as the measured variables.

The present disclosure relates to the subject matter disclosed in Federal Republic of Germany Applications P 37 36 420.0, filed Oct. 28, 1987, and P 38 26 754.3 filed Aug. 6, 1988, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a target classification method including comparing target information extracted from the echo signals of a Doppler radar signal with stored patterns, and wherein a jet aircraft is classified by identification of its engine type, and includes transforming the radar echo signals to a Doppler Spectrum signal by coherent processing, determining a value for the blade repetition rate of an engine rotor of the target from the Doppler spectrum, and using the blade repetition rate for identification; the improvement comprising: additionally analyzing those components of the echo signal modulation in the Doppler spectrum which are periodic with the rotation of the rotor and determining therefrom a value for the rate of rotation of the rotor; determining the number of blades of the engine rotor from the blade repetition rate and the rate of rotation; and utilizing the determined number of the blades of one engine rotor as a classification parameter during said step of comparing.

2. A method as defined in claim 1, further comprising eliminating the primary target line of the Doppler spectrum prior to said step of analyzing to provide a modified Doppler spectrum signal.

3. A method as defined in claim 2, further comprising shifting the modified Doppler spectrum so that the Doppler frequency of the primary line equals zero prior to said step of analyzing.

4. A method as defined in claim 3, further comprising eliminating secondary lines of the Doppler spectrum originating from the blade repetition modulation prior to said step of analyzing.

5. A method as defined in claim 4, wherein said step of analyzing includes retransforming the modified Doppler spectrum signal into a time domain signal, and evaluating the time domain signal to determine the rate of rotation and the duration of one revolution of the target engine rotor.

6. A method as defined in claim 5, wherein said step of evaluating the time domain signal includes subjecting the time domain signal to a maximum likelihood estimation process, and estimating the duration of one revolution of the target engine rotor from the resulting time function.

7. A method as defined in claim 5, wherein the modified Doppler signal spectrum is logarithmed prior to said step of retransforming.

8. A method as defined in claim 6, further comprising providing a level threshold for the evaluation of the retransformed time domain signal and the resulting time function, and evaluating only those lines which exceed said threshold and match the determined blade repetition rate and possible blade numbers.

9. A method as defined in claim 1, wherein said step of determining the number of blades including: creating a hypothetical spectra, with the aid of the determined blade repetition rate, for various hypothetical blade numbers; correlating the hypothetical spectra with the Doppler spectrum derived from the echo signal; and using the blade number associated with the maximum correlation value as the determined number of blades.

10. A method as defined in claim 1, further comprising comparing the determined blade repetition rate with the flight state (e.g. flight altitude, speed, load) of the target determined in previous radar observations and with the known control behavior of the engine according to data stored in a library if there are uncertainties in the determination of the number of blades.

11. In a target classification method utilizing the echo signal of a Doppler radar including comparing target information extracted from the echo signal of a Doppler radar with stored patterns, the improvement comprising transforming the radar echo signals to a Doppler spectrum signal by coherent processing, and classifying a helicopter, by: freeing the Doppler spectrum signal of the primary target echo (fuselage echo); retransforming the remaining Doppler spectrum signal-back to a time domain signal; determining the blade repetition period of the primary or tail rotor of the helicopter from the retransformed time domain signal; and utilizing the determined blade repetition determination for classification during said step of comparing.

12. A method as defined in claim 11, wherein said step of determining includes subjecting the time domain signal to a maximum likelihood estimation process to provide a time function, and obtaining the time value of the level maximum from the time function as an estimate of the blade repetition duration.

13. A method as defined in claim 11, wherein the Doppler spectrum is logarithmed before said step of retransforming into the time domain.

14. A method as defined in claim 11, further comprising subjecting the radar echo signal to preliminary processing for the suppression of fine modulation structures prior to said step of transforming.

15. A method as defined in claim 14, wherein said step of subjecting includes forming the modulus signal from the components of the echo signal present in quadrature form.

16. A method as defined in claim 1, wherein the target parameters are determined repeatedly and successively in time, and are subjected to an M-of-N detection process during said step of comparing.

17. A method as defined in claim 1, further comprising evaluating those echoes for which no classification can be realized as an indication of intentional enemy countermeasures.

18. In a target classification method utilizing the echo signal of a radar system, and including comparing target information extracted from the echo signal of the radar system with stored patterns; the improvement comprising: using a plurality of measured values of the radar echo signal to detect the type of modulation, obtaining at least one measured variable from each measured value; determining the statistical distribution of said measured variables in all measured values; and comparing the statistical distribution with stored patterns.

19. A method as defined in claim 18, wherein the amplitudes and phase positions of the measured values are obtained as said measured variables.

20. A method as defined in claim 18, wherein characteristic variables of the identified distributions are determined, and said characteristic variables are compared with stored patterns.

* * * * *